United States Patent
Ishii

(10) Patent No.: US 7,127,234 B2
(45) Date of Patent: Oct. 24, 2006

(54) RADIO LAN ACCESS AUTHENTICATION SYSTEM

(75) Inventor: Yoshikazu Ishii, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/527,200

(22) PCT Filed: Sep. 24, 2003

(86) PCT No.: PCT/JP03/12125

§ 371 (c)(1),
(2), (4) Date: Mar. 10, 2005

(87) PCT Pub. No.: WO2004/102876

PCT Pub. Date: Nov. 25, 2004

(65) Prior Publication Data

US 2006/0007897 A1    Jan. 12, 2006

(30) Foreign Application Priority Data

May 15, 2003  (JP)  .............................. 2003-137830

(51) Int. Cl.
*H04M 1/66*  (2006.01)

(52) U.S. Cl. .................... 455/411; 455/410; 455/414.1; 455/432.1; 455/432.2; 455/432.3; 455/433; 380/247; 380/248; 380/249; 380/250

(58) Field of Classification Search ................ 380/270, 380/278, 279, 255, 247, 248, 249, 250; 726/2, 726/3, 4; 455/410, 411, 414.1, 432.1, 432.2, 455/432.3, 433

See application file for complete search history.

(56) References Cited

U.S. PATENT DOCUMENTS

| 5,956,331 A | 9/1999 | Rautiola et al. |
| 6,917,804 B1 * | 7/2005 | Takayama et al. ........ 455/432.1 |
| 2002/0034298 A1 * | 3/2002 | Gallagher et al. .......... 380/247 |
| 2003/0039234 A1 * | 2/2003 | Sharma et al. .............. 370/338 |

(Continued)

FOREIGN PATENT DOCUMENTS

JP          09130405          5/1997

(Continued)

OTHER PUBLICATIONS

PCT International Search Report dated Jan. 13, 2004.

(Continued)

*Primary Examiner*—Joseph Feild
*Assistant Examiner*—Olumide Ajibade-Akonai
(74) *Attorney, Agent, or Firm*—Stevens, Davis, Miller & Mosher, LLP

(57) ABSTRACT

A wireless LAN access authentication system capable of shortening the time required for an access authentication procedure of a radio terminal apparatus. In this wireless LAN access authentication system, when a radio terminal apparatus 116 of a user who has sent an access request is already registered through initial access, a gateway apparatus 111 searches for a WEP key assigned to the radio terminal apparatus 116 through a WEP key control section 306 and redistributes the WEP key registered beforehand to a new access point section 124 in the destination area and the radio terminal apparatus 116. The radio terminal apparatus 116 and access point section 124 to which the WEP key has been distributed encrypt transmission/reception data in a predetermined radio section using the redistributed WEP key and carry out a communication.

8 Claims, 8 Drawing Sheets

U.S. PATENT DOCUMENTS

| | | | |
|---|---|---|---|
| 2003/0219129 A1* | 11/2003 | Whelan et al. | 380/270 |
| 2003/0235305 A1* | 12/2003 | Hsu | 380/247 |
| 2004/0068668 A1* | 4/2004 | Lor et al. | 713/201 |
| 2004/0181692 A1* | 9/2004 | Wild et al. | 713/201 |
| 2004/0202141 A1* | 10/2004 | Sinivaara et al. | 370/338 |
| 2004/0214570 A1* | 10/2004 | Zhang et al. | 455/426.2 |
| 2004/0242228 A1* | 12/2004 | Lee et al. | 455/432.1 |
| 2005/0226423 A1* | 10/2005 | Li et al. | 380/278 |

FOREIGN PATENT DOCUMENTS

| | | |
|---|---|---|
| JP | 1013956 | 1/1998 |
| JP | 2002118560 | 4/2002 |
| JP | 2002125069 | 4/2002 |
| JP | 2002125270 | 4/2002 |

OTHER PUBLICATIONS

H. Yoshioka, et al.; "A study for a speedy handover in a radio Local Area Network," 2003 IEICE B-6-194, p. 194 with English translation, no month listed.

* cited by examiner

RADIO LAN ACCESS AUTHENTICATION SYSTEM

TECHNICAL FIELD

The present invention relates to a wireless LAN access authentication system which carries out access authentication of a radio terminal apparatus transmitting/receiving a radio signal, and more particularly, to a wireless LAN access authentication system in a network system which integrates a plurality of wireless LAN network systems having at least two access point sections accessed by the radio terminal apparatus through a radio section transmitting the radio signal.

BACKGROUND ART

A wireless LAN network system using a wireless LAN standard such as IEEE802.11b is operated in a local area network system at an office or company, etc., and a public network system in recent years.

In such a wireless LAN network system, the radio terminal apparatus is authenticated using an ESSID or MAC address and then the radio signal transmitted through the radio section is encrypted by means of WEP (Wired Equivalent Protocol).

However, security vulnerability is pointed out in the case of such access authentication of the radio terminal apparatus and encryption of the radio signal. For this reason, such a network system is being constructed recently that carries out encryption of the radio signal using devices supporting access authentication and a dynamic distribution of WEP keys of the radio terminal apparatus by a RADIUS (Remote Authentication Dial-In User Service) server using IEEE802.1X (EAP: Extensible Authentication Protocol).

On the other hand, with the widespread use of such a network system, there is a growing necessity for the radio terminal apparatus to achieve the handover smoothly between a plurality of network systems in order to realize a more comfortable communication for the user who uses the network system.

As a conventional communication scheme for realizing this handover speed enhancement, there is a proposal on a scheme which creates an access authenticated state of the radio terminal apparatus beforehand at an access point section to which the user's radio terminal apparatus is likely to carry out handover and eliminates the necessity of access authentication for the access point section during the handover of the radio terminal apparatus (e.g., see "A study for a speedy handover in a radio Local Area Network" 2003 Institute of Electronics, Information and Communication Engineers General Assembly B-6-194).

This conventional communication scheme executes the following operations:

(1) According to this communication scheme, normal access authentication is realized between the user's radio terminal apparatus and an authentication server which performs access authentication of the radio terminal apparatus when the user's radio terminal apparatus firstly logs into the access point section.

(2) The access point section into which the user's radio terminal apparatus has logged and the authentication server will keep a certificate (session key) at the time of access authentication as an authentication header which will be used for communications by the user's radio terminal apparatus thereafter.

(3) The authentication server searches for an access point section to which the user's radio terminal apparatus is likely to carry out handover from geographic information of the access point section kept beforehand and distributes the session key to the corresponding access point section.

(4) The nearby access point section to which the user's radio terminal apparatus is likely to carry out handover keeps the session key notified from the authentication server.

(5) When the radio terminal apparatus carries out handover, the access point section which communicates with the user's radio terminal apparatus allows a communication when the session key kept by the access point section matches the session key kept by the radio terminal apparatus.

(6) The access point section which has detected a packet communication from the user's radio terminal apparatus for the first time notifies the authentication server of the login of the user's radio terminal apparatus.

(7) The authentication server notifies the access point section in the communication area into which the user's radio terminal apparatus has newly entered of the session key and requests the access point section which has gone out of the communication area to release the session key.

This communication scheme eliminates the necessity for access authentication for the access point section to which the user's radio terminal apparatus is likely to carry out handover and enables immediate communication between the radio terminal apparatus and the access point.

As the wireless LAN network system, a network system which integrates, for example, an in-house wireless LAN network system and a public wireless LAN network system and provides a continuous seamless communication service for the radio terminal apparatus which moves across these network systems is attracting attention. A possible mode of such a network system integrating a plurality of wireless LAN network systems is a network system which places the authentication server at a center station communicating with the plurality of wireless LAN network systems and controls the radio terminal apparatus in a centralized manner.

Here, a case where in a network system in which the center station controls the radio terminal apparatus in a centralized manner, the radio terminal apparatus moves across the plurality of wireless LAN network systems carrying out handover to a new access point section will be considered.

In this case, a wireless LAN access authentication system using the current IEEE802.1X needs to exchange an authentication number (authentication signal) between the radio terminal apparatus and the authentication server of the center station every time the access point section accessed by the radio terminal apparatus is changed.

For this reason, the conventional wireless LAN access authentication system has a problem that procedures for access authentication of the radio terminal apparatus and an access authentication carried out accompanying the distribution of a WEP key which is a cryptographic key for encrypting a radio signal transmitted through the radio section result in an increase in the time necessary for handover of the radio terminal apparatus, causing a packet loss.

Moreover, the conventional wireless LAN access authentication system has a problem that due to the exchange of the authentication signal between the radio terminal apparatus and the center station carried out every time the radio terminal apparatus moves across a plurality of access point sections, the proportion of a control signal such as the authentication signal in the transmission path between the center station and each of the wireless LAN network system increases, preventing effective utilization of frequency bands in the transmission path.

The aforementioned communication scheme (see "A study for a speedy handover in a radio Local Area Network" 2003 Institute of Electronics, Information and Communication Engineers General Assembly B-6-194) is intended to solve such a problem.

However, as described above, it is difficult to apply the communication scheme to a large-scale network system which integrates the plurality of wireless LAN network systems and controls user IDs and the WEP keys, etc., used for access authentication of the radio terminal apparatus by the center station in a centralized manner.

That is, when the communication scheme is applied to a large-scale network system in which the user IDs and the WEP keys, etc., are controlled by the center station in a centralized manner, it is necessary to distribute the WEP keys to an access point section near each wireless LAN network system every time the radio terminal apparatus moves so that the radio terminal apparatus can move across the plurality of wireless LAN network systems seamlessly.

For this reason, even when the communication scheme is adopted, such a large-scale network system still needs to frequently exchange control signals such as the authentication signal through the transmission path between the center station and each of the plurality of wireless LAN network systems.

Furthermore, in the communication scheme, the authentication server of the center station needs to control position information of the radio terminal apparatus and geographic information of each access point section of the wireless LAN network system. However, the authentication server of the center station performing such control of geographic information of each access point section leads to a further increase of load on the authentication server.

For the above described reasons, it is extremely difficult for the aforementioned large-scale network system integrating a plurality of wireless LAN network systems to apply the communication scheme.

DISCLOSURE OF THE INVENTION

It is an object of the present invention to provide a wireless LAN access authentication system capable of reducing the time required for a procedure of access authentication of a radio terminal apparatus in a network system in which a center station integrates and controls a plurality of wireless LAN network systems in a centralized manner and reducing the number of control signals such as authentication signals between the center station and each of the wireless LAN network systems.

In order to attain the above described object, the wireless LAN access authentication system of the present invention is a wireless LAN access authentication system in a network system, comprising a plurality of wireless LAN network systems and a center station that controls the plurality of wireless LAN network systems in a centralized manner, each of the plurality of wireless LAN network systems comprising at least two access point sections accessed by a radio terminal apparatus that transmits/receives a radio signal through a radio section and a gateway apparatus which relays transmission/reception of data signals and control signals between the access point sections, and the center station comprising a center station gateway apparatus that relays transmission/reception of data signals and control signals between the gateway apparatuses of the plurality of wireless LAN network systems and an authentication server that performs access authentication of the radio terminal apparatus which has accessed the access point sections and distributes cryptographic keys used for encryption of a radio section through which the access-authenticated radio terminal apparatus carries out communication to the radio terminal apparatus and the access point section, the wireless LAN access authentication system comprising an access control section provided for each of the plurality of wireless LAN network systems for controlling the situation of access of the radio terminal apparatus in the own communication area to the authentication server and checking the presence/absence of access of the radio terminal apparatus to the authentication server when the radio terminal apparatus moves to a communication area of a new access point section and a cryptographic key control section provided for each of the plurality of wireless LAN network systems for controlling cryptographic keys distributed from the authentication server and distributing, when the access control section confirms that the radio terminal apparatus which has moved to the communication area of the other access point section has already accessed the authentication server, the cryptographic key for the radio section through which the radio terminal apparatus carries out communication to the radio terminal apparatus and the new access point section to which the radio terminal apparatus has moved.

BEST MODE FOR CARRYING OUT THE INVENTION

An essence of the present invention is to control the situation of access of a radio terminal apparatus to an authentication server of a center station which integrates a plurality of wireless LAN network systems through an access control section of each of the wireless LAN network systems and distribute, when it is confirmed that the radio terminal apparatus which has moved to a communication area of a new access point section has already accessed the authentication server, a cryptographic key of the radio section to the radio terminal apparatus and the new access point section in the area to which the radio terminal apparatus has moved through a cryptographic key control section of each wireless LAN network system.

With reference now to the attached drawings, embodiments of the present invention will be explained in detail below. The following explanations will describe a network system which integrates an in-house wireless LAN network system and public wireless LAN network system as an example of the wireless LAN network system.

(Embodiment 1)

Figure 1:
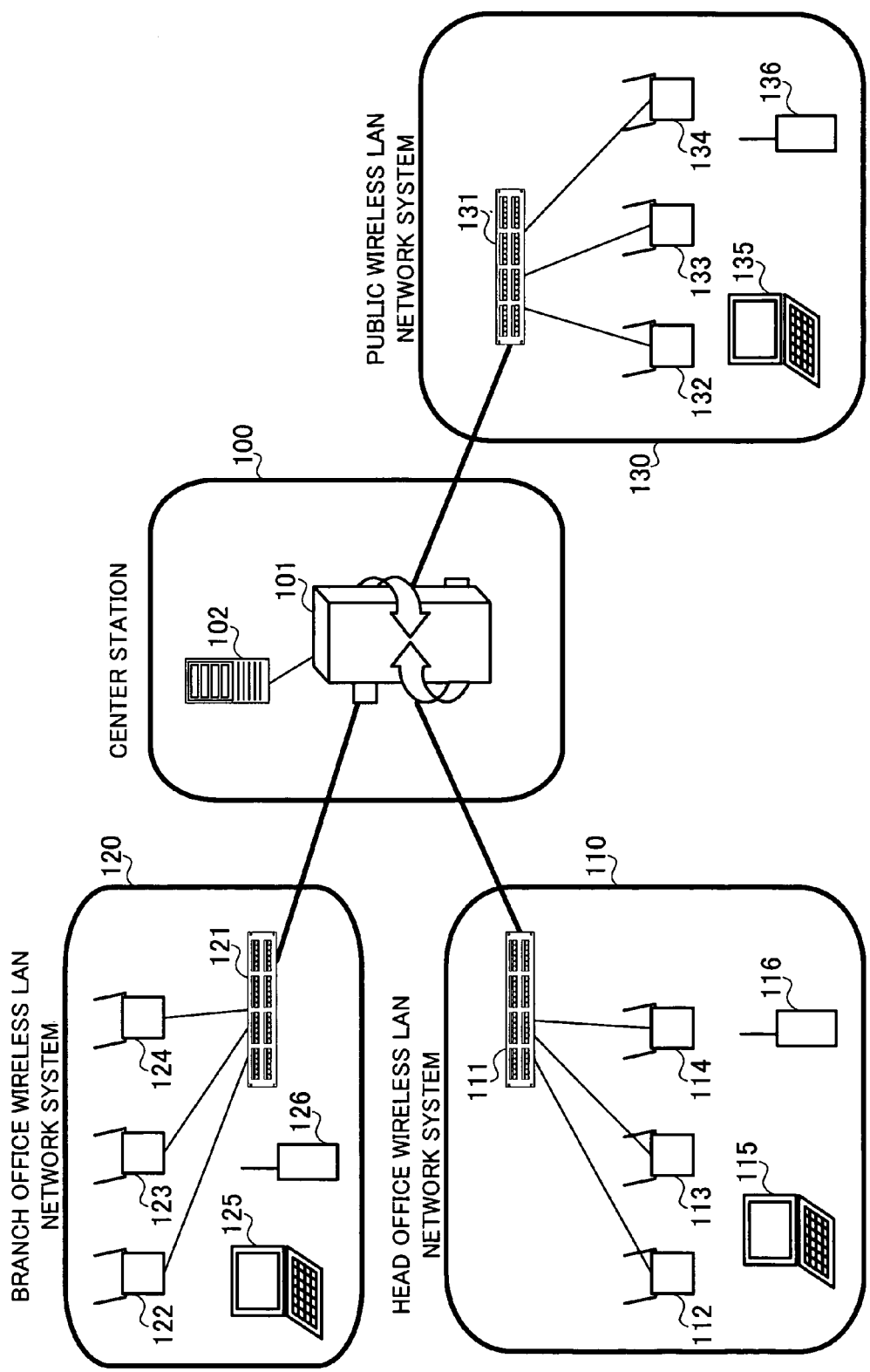
FIG. 1 is a schematic block diagram showing a configuration of a wireless LAN access authentication system according to Embodiment 1 of the present invention.

FIG. 1 is a schematic block diagram showing a configuration of a network system using a wireless LAN access authentication system according to Embodiment 1 of the present invention. As shown in FIG. 1, this network system comprises a center station 100, a head office wireless LAN network system 110, a branch office wireless LAN network system 120 and a public wireless LAN network system 130.

In FIG. 1, the center station 100 controls the head office wireless LAN network system 110, the branch office wireless LAN network system 120 and public wireless LAN network system 130 in a centralized manner. Furthermore, the center station 100 comprises a center station gateway apparatus 101 and an authentication server 102.

On the other hand, the head office wireless LAN network system 110 comprises a head office gateway apparatus 111 and head office access point sections 112, 113, 114. This head office wireless LAN network system 110 carries out communications using radio terminal apparatuses 115, 116 such as a notebook personal computer, PDA and cellular phone set.

Furthermore, the branch office wireless LAN network system 120 comprises a branch office gateway apparatus 121 and branch office access point sections 122, 123, 124. This branch office wireless LAN network system 120 carries out communications using radio terminal apparatuses 125, 126 such as a notebook personal computer, PDA and cellular phone set.

Furthermore, the public wireless LAN network system 130 comprises a public gateway apparatus 131 and public access point sections 132, 133, 134. This public wireless LAN network system 130 carries out communications using radio terminal apparatuses 135, 136 such as a notebook personal computer, PDA and cellular phone set.

Next, the operation of each apparatus constituting a network system using a wireless LAN access authentication system according to this Embodiment 1 will be explained using a sequence diagram shown in FIG. 2.

Figure 2:
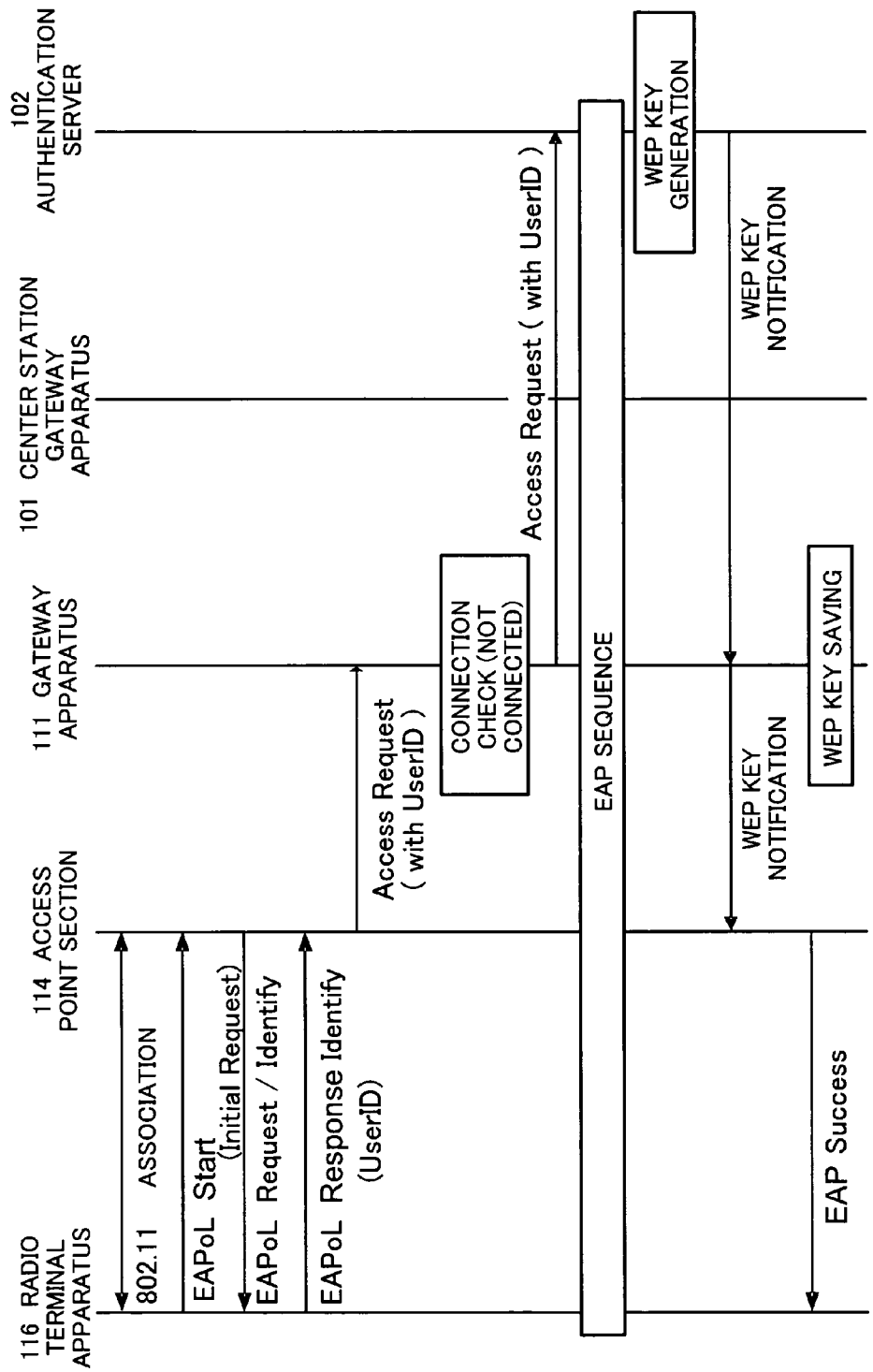
FIG. 2 is a sequence diagram showing the operation of access authentication in the wireless LAN access authentication system according to Embodiment 1 of the present invention.

In FIG. 2, when a radio terminal apparatus (here, suppose the radio terminal apparatus 116) accesses the head office wireless LAN network system 110, branch office wireless LAN network system 120 or public wireless LAN network system 130 for the first time, the radio terminal apparatus sends an access request to a desired access point section (here, suppose the head office access point section 114). After the access to the head office access point section 114 is completed through a radio section, the access of this radio terminal apparatus 116 is authenticated using a predetermined authentication procedure.

This authentication procedure is carried out by the radio terminal apparatus 116 accessing the authentication server 102 in the center station 100 through the head office gateway apparatus 111 of the head office wireless LAN network system 110 and the center station gateway apparatus 101 of the center station 100 based on the IEEE802.1X protocol.

In this authentication procedure, as shown in FIG. 2, the head office access point section 114 requests Identity from the radio terminal apparatus 116 which has sent an access request to the head office access point section 114. In response to the request for the Identity, the radio terminal apparatus 116 sends a response signal including the user ID of the user of the radio terminal apparatus 116 to the head office access point section 114. The head office access point section 114 which has received the response signal sends an authentication signal for access authentication of the radio terminal apparatus 116 to the head office gateway apparatus 111.

Here, a case where the radio terminal apparatus 116 in the head office wireless LAN network system 110 accesses the authentication server 102 of the center station 100 through the head office access point section 114 has been explained, but similar operations will also be performed for other radio terminal apparatuses.

The gateway apparatuses 111, 121, 131 located in the wireless LAN network systems 110, 120, 130 of the network system using the wireless LAN access authentication system according to Embodiment 1 have the following configurations.

Figure 3:
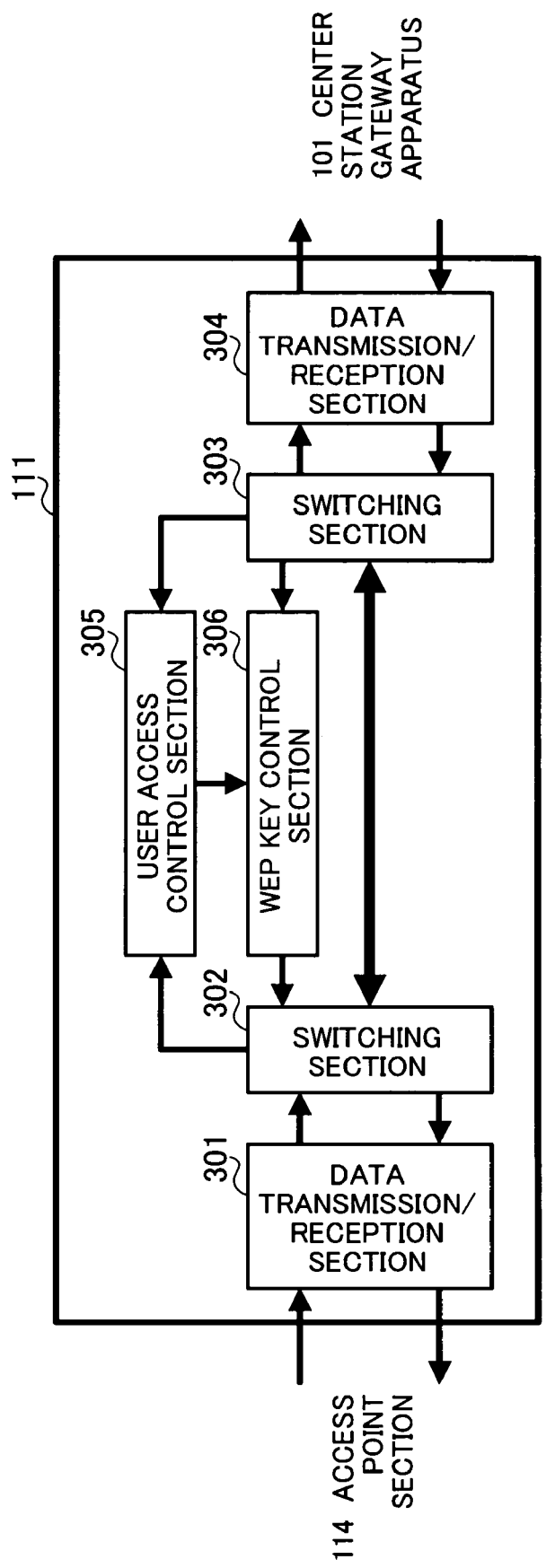
FIG. 3 is a block diagram showing a configuration of a gateway apparatus of each wireless LAN network system used in the wireless LAN access authentication system according to Embodiment 1 of the present invention.

FIG. 3 is a block diagram showing a gateway apparatus having a configuration common to the gateway apparatuses 111, 121, 131.

As shown in FIG. 3, each of the gateway apparatuses 111, 121, 131 is provided with a data transmission/reception section 301, a switching section 302, a switching section 303, a data transmission/reception section 304, a user access control section 305 and a WEP key control section 306.

Here, the data transmission/reception section 301 transmits/receives data to/from an access point section with which it communicates. The switching section 302 selects a transmission path for the data transmission/reception section 301. The switching section 303 selects a transmission path for the data transmission/reception section 304. The data transmission/reception section 304 transmits/receives data to/from the center station gateway apparatus with which it communicates. The user access control section 305 controls the access situation of each radio terminal apparatus with which it communicates. The WEP key control section 306 controls cryptographic keys (WEP keys) distributed from the authentication server 102 in association with the assigned radio terminal apparatuses.

The gateway apparatus (here, suppose the head office gateway apparatus 111) checks the access situation of a radio terminal apparatus which has sent an access request (here, suppose the radio terminal apparatus 116) according to, for example, a response signal including the user ID sent from the access point section 114. Here, if the radio terminal apparatus 116 which has sent the access request is a radio terminal apparatus of initial access which has accessed for the first time, the radio terminal apparatus 116 is registered as "no access" in the user access control section 305.

In the case of the initial access, the gateway apparatus 111 transfers the response signal to the authentication server 102 through the center station gateway apparatus 101 of the center station 100 which performs centralized control.

The authentication server 102 which has received this response signal exchanges an authentication sequence with the radio terminal apparatus 116 which has sent the access request through the center station gateway apparatus 101, gateway apparatus 111 and access point section 114 to perform access authentication of the radio terminal apparatus 116 which has sent the access request.

Furthermore, when the access authentication of the radio terminal apparatus 116 which has sent the access request as described above is completed, the authentication server 102 distributes a WEP key which is a cryptographic key for encrypting transmission/reception data of the radio section to this radio terminal apparatus and each access point section. At this time, the gateway apparatus 111 registers the user ID of the radio terminal apparatus 116 whose access authentication has been completed in the user access control section 305 and controls the access situation of the radio terminal apparatus 116 whose access authentication has been completed.

On the other hand, the WEP key control section 306 associates the distributed cryptographic key (WEP key) with the assigned radio terminal apparatus 116 and saves the WEP key of the radio terminal apparatus 116 whose access authentication has been completed. The radio terminal apparatus 116 and access point section 114 to which the WEP key has been distributed communicate transmission/reception data of the radio section encrypted using the WEP key.

Next, the operation of a radio terminal apparatus, which has been carrying out communication via an access point section in a wireless LAN network system, and moves and carries out access authentication to realize a communication via an access point section in another wireless LAN network system, will be explained.

Figure 4:
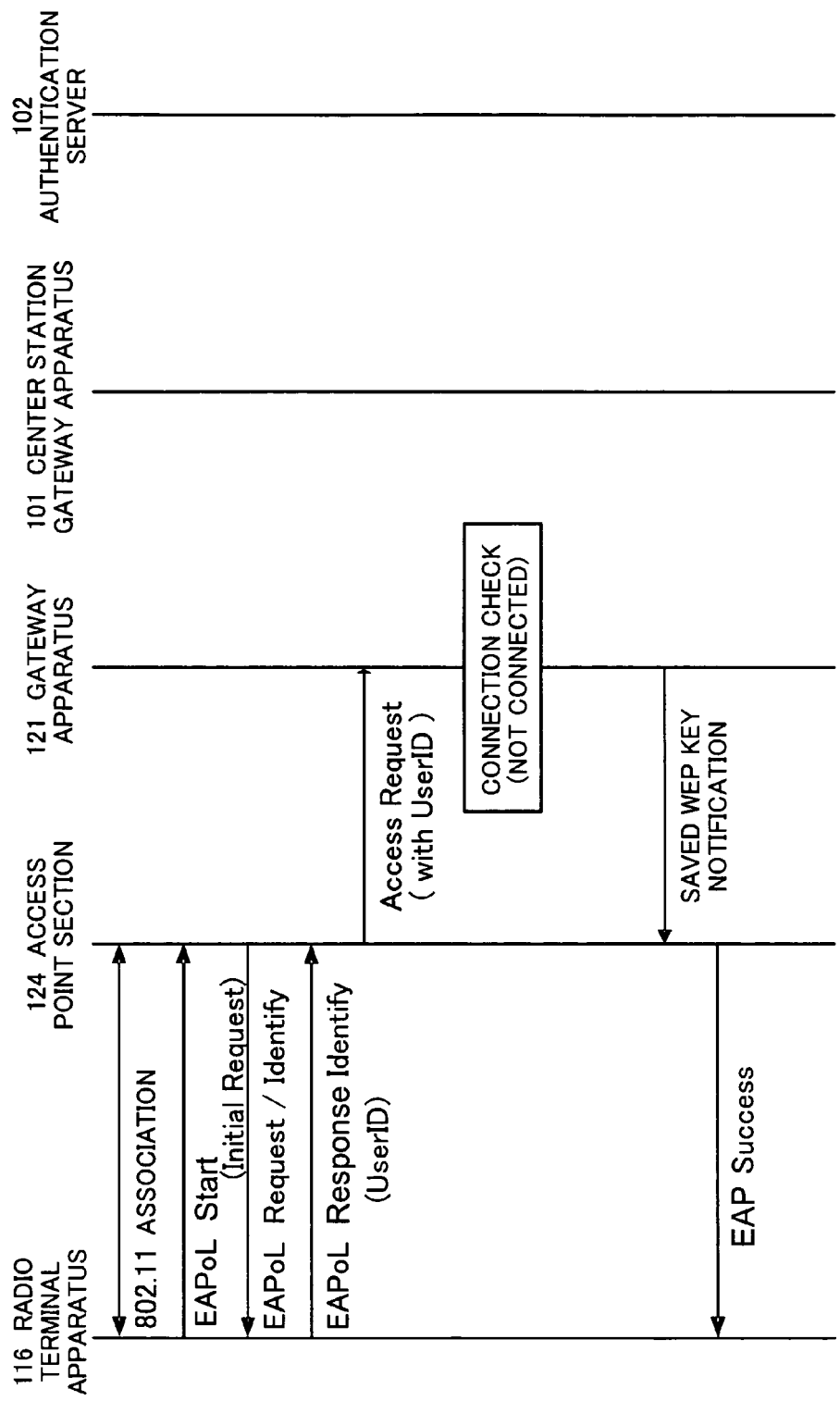
FIG. 4 is a sequence diagram showing the operation of access authentication when a radio terminal apparatus moves in the wireless LAN access authentication system according to Embodiment 1 of the present invention.

FIG. 4 is a sequence diagram showing the operation in the case where such a radio terminal apparatus moving across access point sections carries out access authentication. Here, suppose the wireless LAN network system is the head office wireless LAN network system 110 and the access point section is the head office access point section 114. Furthermore, suppose the radio terminal apparatus is the radio terminal apparatus 116 and the access point section in the other wireless LAN network system is the access point section 124 of the branch office wireless LAN network system 120.

In FIG. 4, the moving radio terminal apparatus 116 detects a beacon (call sign and carrier) from the new access point section 124 in the destination area, sends an access request to this new access point section 124 and carries out an access procedure of a predetermined radio section.

When the access procedure is completed, this moving radio terminal apparatus 116 receives an Identity request from the new access point section 124 to carry out access authentication. In response to this Identity request, the radio terminal apparatus 116 sends a response signal including a user ID to the new access point section 124.

The access point section 124 which has received the response signal sends the response signal from the radio terminal apparatus 116 to the gateway apparatus 121. The gateway apparatus 121 checks the access situation of the radio terminal apparatus 116 of the user who sent the access request through the user access control section 305 based on the response signal including the user ID sent from the access point section 124.

Here, if the radio terminal apparatus 116 of the user who sent the access request is already registered through the aforementioned initial access, the gateway apparatus 121 searches for the WEP key assigned to the radio terminal apparatus 116 which sent the access request through the WEP key control section 306 and redistributes the WEP key registered beforehand to the new access point section 124 in the destination area and the radio terminal apparatus 116 which sent the access request.

In this way, the radio terminal apparatus 116 and access point section 124 to which the WEP key has been distributed communicate transmission/reception data of a predetermined radio section encrypted using the redistributed WEP key.

The user access control section 305 and WEP key control section 306 control the access situation of the radio terminal apparatus and assigned WEP key, delete the registration corresponding to a radio terminal apparatus which has sent no access request for a certain time, to respond to the radio terminal apparatus when the apparatus turns off the power or when the apparatus moves to another domain.

The wireless LAN access authentication system according to Embodiment 1 provides the user access control section 305 and WEP key control section 306 which control the access situation of the user's radio terminal apparatus and the WEP key for each of the gateway apparatuses 111, 121, 131, but the user access control section 305 and WEP key control section 306 may also be separated from the gateway apparatus and provided independently of each of the wireless LAN network systems.

Thus, in the wireless LAN access authentication system according to this Embodiment 1, the gateway apparatuses 111, 121, 131 provided in each wireless LAN network system can carry out access authentication and distribute WEP keys when accessing a new access point section, and can thereby shorten the time required for an access authentication procedure accompanying the movement of the radio terminal apparatus.

In this way, the wireless LAN access authentication system according to Embodiment 1 can shorten the time required for handover when the radio terminal apparatus moves, drastically reduce the authentication signaling number between each wireless LAN network system and center station 100 and effectively use frequency bands in a transmission path.

(Embodiment 2)

Next, Embodiment 2 of the present invention will be explained in detail with reference to the attached drawings.

The wireless LAN access authentication system according to Embodiment 2 of the present invention has a function of counting an access time and communication packet amount of a radio terminal apparatus with which it communicates in addition to the wireless LAN access authentication system according to Embodiment 1 of the present invention.

The wireless LAN access authentication system according to this Embodiment 2 requests the radio terminal apparatus for reauthentication with the authentication server 102 of the center station 100 and distribution of a new cryptographic key when the access time of the radio terminal apparatus with which it communicates or a communication packet amount reaches a predetermined amount.

Figure 5:
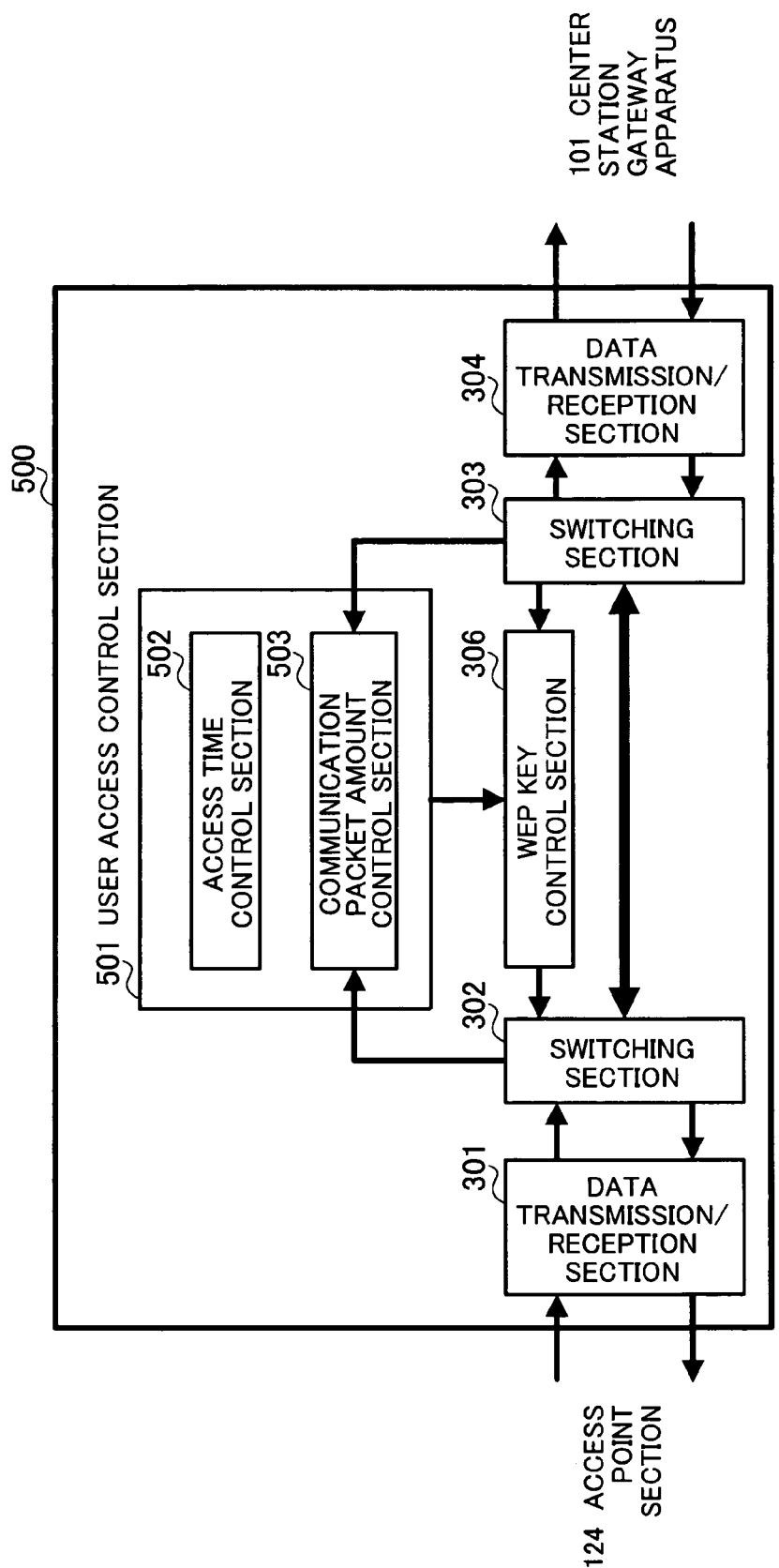
FIG. 5 is a block diagram showing a configuration of a gateway apparatus of each wireless LAN network system used in a wireless LAN access authentication system according to Embodiment 2 of the present invention.

FIG. 5 shows a configuration of a gateway apparatus used in the wireless LAN access authentication system according to this Embodiment 2. In the gateway apparatus used in the wireless LAN access authentication system according to this Embodiment 2, the components having the same functions as those of the gateway apparatus 300 shown in FIG. 3 are assigned the same reference numerals and detailed explanations thereof will be omitted.

As shown in FIG. 5, a gateway apparatus 500 used in the wireless LAN access authentication system according to this Embodiment 2 has a user access control section 501 instead of the user access control section 305 in Embodiment 1 of the present invention. The user access control section 501 of this gateway apparatus 500 is provided with an access time control section 502 and communication packet amount control section 503. The access time control section 502 counts an access time of each radio terminal apparatus with which it communicates. Furthermore, the communication packet amount control section 503 counts a communication packet amount of each radio terminal apparatus with which it communicates.

Figure 6:
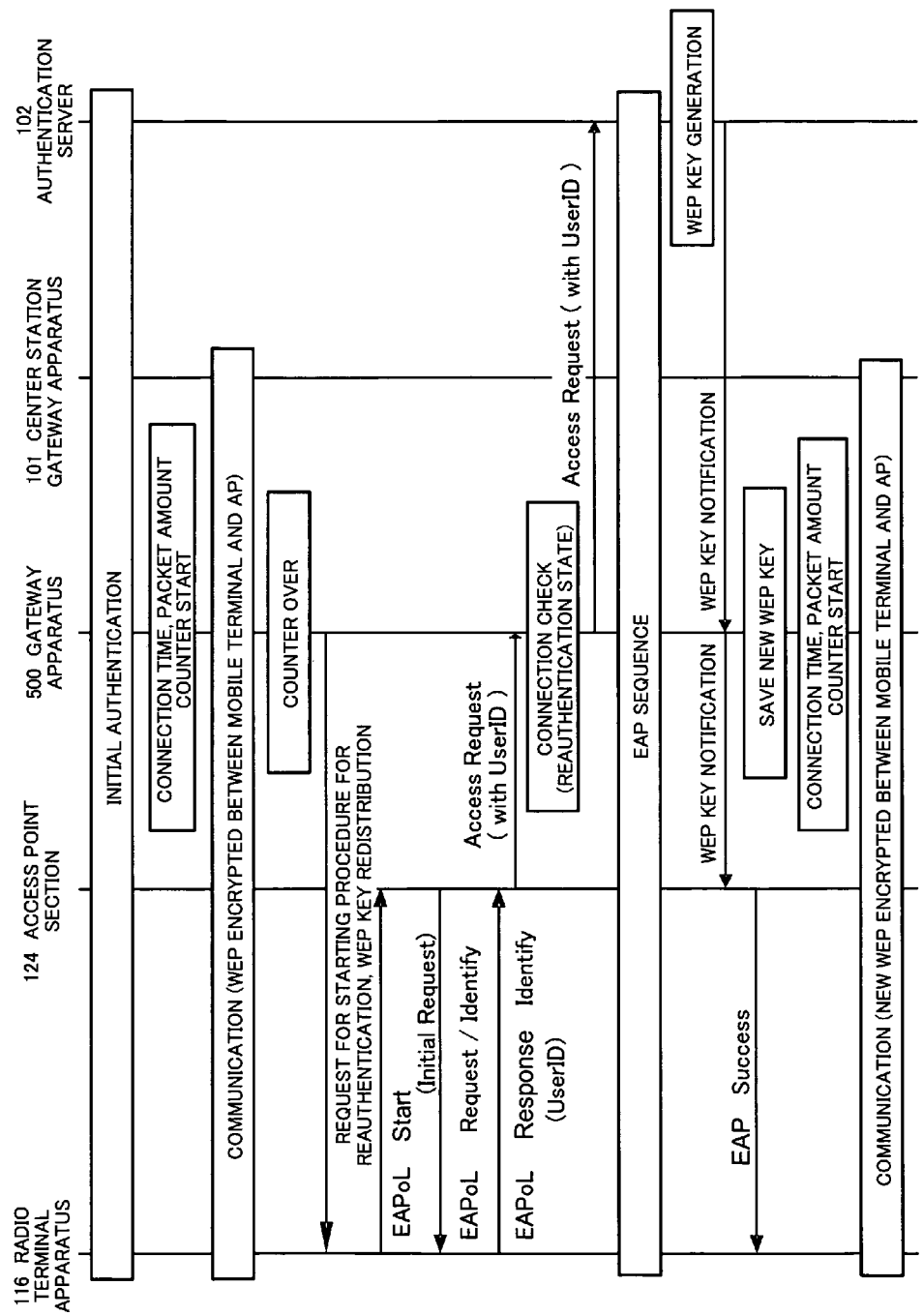
FIG. 6 is a sequence diagram showing the operation of access authentication when a radio terminal apparatus moves in the wireless LAN access authentication system according to Embodiment 2 of the present invention.

Next, the operation up to reauthentication and redistribution of a cryptographic key of the radio terminal apparatus of the wireless LAN access authentication system according to this Embodiment 2 will be explained. FIG. 6 is a sequence diagram showing the operation up to reauthentication and redistribution of acryptographic key of the radio terminal apparatus (here, suppose radio terminal apparatus 116) in the wireless LAN access authentication system according to this Embodiment 2.

In FIG. 6, when access authentication between the radio terminal apparatus 116 which has sent an access request and authentication server 102 is completed, the radio terminal apparatus 116 starts a communication with a desired network system. Furthermore, simultaneously with this, the access time control section 502 and communication packet amount control section 503 of the gateway apparatus 500 start to count the access time and packet amount of the radio terminal apparatus 116.

Here, for example, when the radio terminal apparatus 116 which is carrying out communication via the access point section 114 moves and attempts to carry out communication via a new access point section 124, a cryptographic key (WEP key) controlled by the WEP key control section 306 of the gateway apparatus 500 is redistributed to this moving radio terminal apparatus 116 and the new access point section 124 in the destination area. In this way, the moving radio terminal apparatus 116 carries out communication using the same cryptographic key as the cryptographic key distributed at the time of initial access authentication.

Then, when the access time or communication packet amount counted by the access time control section 502 or communication packet amount control section 503 of the gateway apparatus 500 reaches a predetermined amount, the gateway apparatus 500 notifies the accessing radio terminal apparatus 116 of a signal requesting the execution of a procedure for reauthentication and redistribution of a cryptographic key with the authentication server 102 of the center station 100.

At this time, the registration content of the access situation of the user's radio terminal apparatus 116 controlled by the user access control section 501 of the gateway apparatus 500 is changed to the content indicating that the reauthentication is necessary. Furthermore, the communication mode of this wireless LAN access authentication system is changed to a mode in which the authentication signal sent from the radio terminal apparatus 116 is transferred to the authentication server 102 of the center station 100.

In this way, when the radio terminal apparatus 116 which has received the signal requesting the reauthentication and redistribution of the cryptographic key sends an authentication request signal to the access point section 124, a series of authentication sequences shown in FIG. 6 is started.

When a predetermined authentication procedure based on the IEEE802.1X protocol is completed, a new cryptographic key (WEP key) is distributed to the radio terminal apparatus 116 and new access point section 124 in the destination area by the authentication server 102, and the radio terminal apparatus 116 and the new access point section 124 in the destination area communicate transmission data encrypted using a new cryptographic key.

Furthermore, simultaneously with this, the gateway apparatus 500 saves a new cryptographic key through the WEP key control section 306 and starts counting the access time and packet amount of the radio terminal apparatus 116 through the access time control section 502 and communication packet amount control section 503.

In this way, in the wireless LAN access authentication system according to this Embodiment 2, the access time control section 502 and communication packet amount control section 503 of the gateway apparatus 500 control the access time and packet amount of the radio terminal apparatus 116.

Then, when the access time or communication packet amount of the accessing radio terminal apparatus 116 reaches a predetermined amount, this radio terminal apparatus 116 is requested to carry out the procedure for reauthentication of access authentication and redistribution of the cryptographic key with the authentication server 102 of the center station 100.

Therefore, according to the wireless LAN access authentication system according to this Embodiment 2, the cryptographic key (WEP key) used between this radio terminal apparatus and the access point section of the radio terminal apparatus is updated every time the access time or communication packet amount of the accessing radio terminal apparatus reaches a predetermined amount, thus preventing illegal access by a spoofed radio terminal apparatus through decryption of the WEP key, etc.

(Embodiment 3)

Next, Embodiment 3 of the present invention will be explained in detail with reference to the attached drawings.

In the wireless LAN access authentication system according to Embodiment 3 of the present invention, each radio terminal apparatus is provided with an SIM (Subscriber Identity Module) card as an information card which records ID information used when access of the radio terminal apparatus is authenticated by the authentication server 102 of the center station 100, extracts a user ID used for the aforementioned access authentication from within this SIM card and carries out an access authentication procedure.

Figure 7:
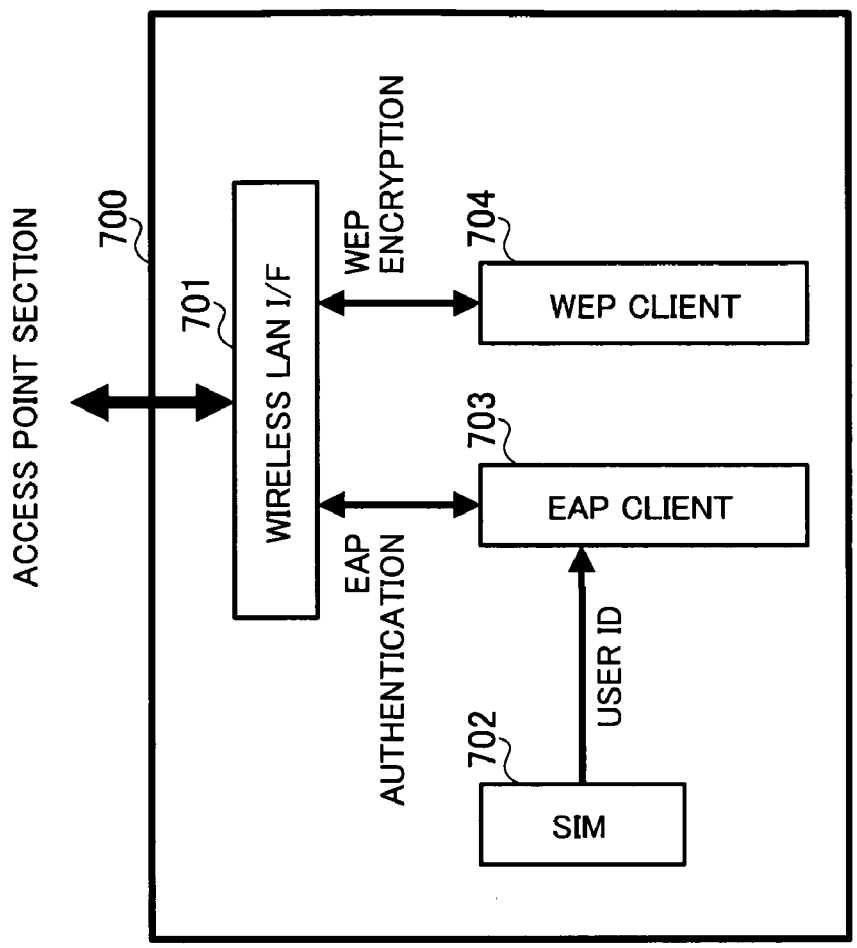
FIG. 7 is a block diagram showing a configuration of a radio terminal apparatus used in a wireless LAN access authentication system according to Embodiment 3 of the present invention.

FIG. 7 is a block diagram showing the configuration of a radio terminal apparatus used in the wireless LAN access authentication system according to this Embodiment 3. As shown in FIG. 7, this radio terminal apparatus 700 is provided with a wireless LAN I/F (access interface for wireless LAN) 701, an SIM card 702, an EAP client 703 and a WEP client 704.

In this radio terminal apparatus 700, the EAP client 703 having the IEEE802.1x (EAP: Extensible Authentication Protocol) function exchanges an authentication signal with the authentication server 102 of the center station 100. Then, an IEEE802.1x sequence is executed using a user ID recorded in the SIM card 702.

The user ID recorded in the SIM card 702 is also registered in the authentication server 102 of the center station 100. Furthermore, the radio terminal apparatus 700 performs encryption and decryption using a cryptographic key assigned from the authentication server 102 after access authentication by the WEP client 704.

Figure 8:
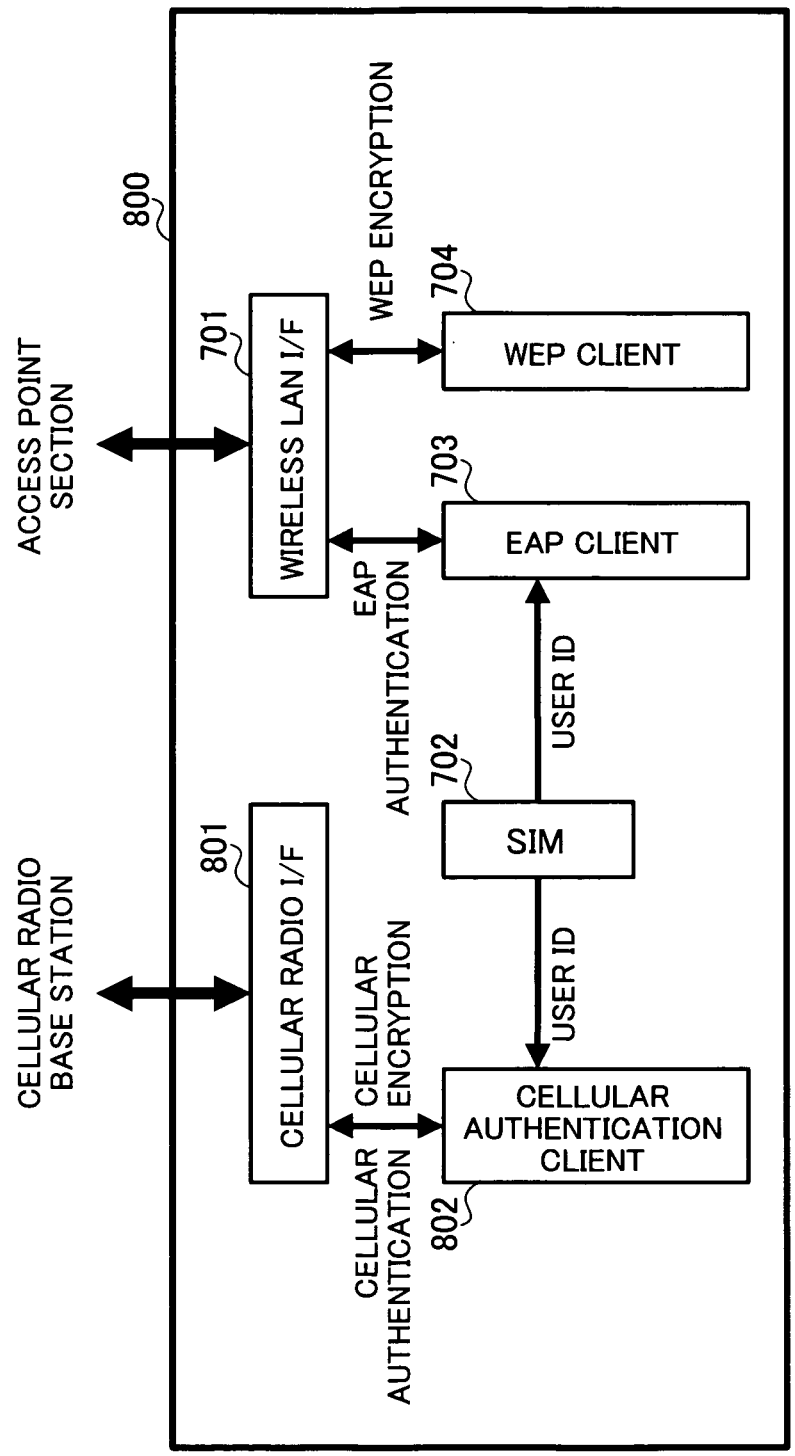
FIG. 8 is a block diagram showing another configuration of a radio terminal apparatus used in the wireless LAN access authentication system according to Embodiment 3 of the present invention.

FIG. 8 is a block diagram showing another configuration of the radio terminal apparatus used in the wireless LAN access authentication system according to this Embodiment 3. As shown in FIG. 8, this radio terminal apparatus 800 is provided with a cellular wireless I/F 801 and a cellular authentication client 802 in addition to the configuration of the radio terminal apparatus 700 shown in FIG. 7. That is, this radio terminal apparatus 800 is provided with the cellular wireless I/F 801 which is a cellular wireless access interface in addition to the wireless LAN I/F 701 which is a wireless LAN access interface.

In this radio terminal apparatus 800, as shown in FIG. 8, the user ID recorded in the SIM card 702 is given to the EAP client 703 and used for access authentication on the wireless LAN network system side.

Furthermore, in this radio terminal apparatus 800, the user ID recorded in the SIM card 702 is also given to the cellular authentication client 802 which authenticates the cellular wireless network system side and also used for access authentication on the cellular wireless network system side.

Here, the case where the user ID of the SIM card 702 mounted in the radio terminal apparatus 700 or radio terminal apparatus 800 is used for access authentication has been explained, but as the user information used for access authentication, it is also possible to use user information recorded in, for example, a UIM (User Identity Module) card mounted in a third-generation cellular phone set to perform a similar authentication procedure.

According to the wireless LAN access authentication system according to this Embodiment 3, even when the user changes the type of the radio terminal apparatus, the authentication ID at the time of access authentication of the user is prevented from being changed and it is possible to control the user ID and billing on the user in a centralized manner and also unify access authentication and billing of both the cellular wireless network system and wireless LAN network system.

The wireless LAN access authentication system according to an embodiment of the present invention is a wireless LAN access authentication system in a network system comprising a plurality of wireless LAN network systems and a center station that controls the plurality of wireless LAN network systems in a centralized manner, each of the plurality of wireless LAN network systems comprising at least two access point sections accessed by a radio terminal apparatus that transmits/receives a radio signal through a radio section and a gateway apparatus which relays transmission/reception of data signals and control signals between the access point sections, the center station comprising a center station gateway apparatus that relays transmission/reception of data signals and control signals between the gateway apparatuses of the plurality of wireless LAN network systems and an authentication server that performs access authentication on the radio terminal apparatus which has accessed the access point sections and distributes cryptographic keys used for encryption of a radio section through which the access-authenticated radio terminal apparatus carries out communication to the radio terminal apparatus and the access point section, the wireless LAN access authentication system comprising an access control section provided for each of the plurality of wireless LAN network systems for controlling the situation of access of the radio terminal apparatus in the own communication area to the authentication server and checking the presence/absence of access of the radio terminal apparatus to the authentication server when the radio terminal apparatus moves to a communication area of a new access point section and a cryptographic key control section provided for each of the plurality of wireless LAN network systems for controlling cryptographic keys distributed from the authentication server and distributing, when the access control section confirms that the radio terminal apparatus which has moved to the communication area of the other access point section has already accessed the authentication server, the cryptographic key for the radio section through which the radio terminal apparatus carries out communication to the radio terminal apparatus and the new access point section in the area to which the radio terminal apparatus has moved.

In this configuration, when the radio terminal apparatus moves within a predetermined wireless LAN network, the access control section checks the situation of access of the radio terminal apparatus to the authentication server. When it is confirmed that this radio terminal apparatus has already accessed the authentication server, the cryptographic key control section distributes the cryptographic key to the radio terminal apparatus and the new access point section in the area to which the radio terminal apparatus has moved. The radio terminal apparatus which is confirmed to have already accessed the authentication server is granted access to a desired wireless LAN network without exchanging any authentication signal with the authentication server of the center station when the radio terminal apparatus moves to the new access point section. Thus, this configuration can shorten the time required for an authentication procedure for access authentication accompanying the movement of the radio terminal apparatus, facilitate handover of the radio terminal apparatus to the new access point section, drastically reduce the number of control signals (authentication signaling number) between each of the wireless LAN networks and the center station and realize effective utilization of frequency bands in a transmission path.

Furthermore, in the wireless LAN access authentication system according to another embodiment of the present invention, the access control section and the cryptographic key control section are arranged in the gateway apparatus.

According to this configuration, since the access control section and the cryptographic key control section are arranged in each gateway apparatus of each of the wireless LAN networks, it is possible to simplify the configuration of each of the wireless LAN networks.

In the wireless LAN access authentication system according to a further embodiment of the present invention, the access control section includes a control section that controls at least one access amount of an access time or communication packet amount of the radio terminal apparatus and requests the radio terminal apparatus for reauthentication when the access amount reaches a predetermined amount.

According to this configuration, the control section requests the radio terminal apparatus for reauthentication when the access amount reaches a predetermined amount, allowing the radio terminal apparatus to update the cryptographic key of the radio section of communication. Thus, this configuration can prevent a spoofed radio terminal apparatus from illegally accessing by decrypting the cryptographic key.

In the wireless LAN access authentication system according to a still further embodiment of the present invention, the radio terminal apparatus is provided with an information card which records ID information and uses the ID information recorded in the information card as an authentication ID at the time of access authentication of the radio terminal apparatus.

In this configuration, the ID information recorded in the information card (e.g., SIM card or UIM card) of the radio terminal apparatus is used as an authentication ID for access authentication of the radio terminal apparatus. Therefore, according to this configuration, it is possible to prevent the authentication ID from being changed at the time of access authentication of the user even when the user changes the type of the radio terminal apparatus and control the user ID and billing on the user in a centralized manner.

Furthermore, the wireless LAN access authentication method according to a still further embodiment of the present invention is a wireless LAN access authentication method in a network system comprising a plurality of wireless LAN network systems and a center station that controls the plurality of wireless LAN network systems in a centralized manner, each of the plurality of wireless LAN network systems comprising at least two access point sections accessed by a radio terminal apparatus that transmits/receives a radio signal through a radio section and a gateway apparatus which relays transmission/reception of data signals and control signals between the access point sections, and the center station comprising a center station gateway apparatus that relays transmission/reception of data signals and control signals between each of the gateway apparatuses of the plurality of wireless LAN network systems and an authentication server that performs access authentication of the radio terminal apparatus accessed by the access point sections and distributes cryptographic keys used for encryption of a radio section through which the access-authenticated radio terminal apparatus carries out communication to the radio terminal apparatus and the access point section, the wireless LAN access authentication method comprising an access control step of controlling the situation of access of the radio terminal apparatus in each of the wireless LAN network systems to the authentication server and checking the presence/absence of access of the radio terminal apparatus to the authentication server when the radio terminal apparatus moves to a communication area of a new access point section and a cryptographic key control step of controlling cryptographic keys distributed from the authentication server and distributing, when it is confirmed in the access control step that the radio terminal apparatus which has moved to the communication area of the other access point section has already accessed the authentication server, the cryptographic key for the radio section through which the radio terminal apparatus carries out communication to the radio terminal apparatus and the new access point section in the area to which the radio terminal apparatus has moved.

According to this method, when the radio terminal apparatus moves within a predetermined wireless LAN network, the situation of access of the radio terminal apparatus to the authentication server is checked in the access control step. When it is confirmed that the radio terminal apparatus has already accessed the authentication server, the cryptographic key is distributed to the radio terminal apparatus and a new access point section in the area to which the radio terminal apparatus has moved in the cryptographic key control step. The radio terminal apparatus confirmed to have already accessed the authentication server in this way is granted access to a desired wireless LAN network when moving to a new access point section without exchanging any authentication signal with the authentication server of the center station. Therefore, according to this configuration, it is possible to shorten the time required for an authentication procedure for access authentication accompanying the movement of the radio terminal apparatus Furthermore, this configuration allows the radio terminal apparatus to carry out handover to a new access point section easily. Moreover, this configuration can drastically reduce the number of control signals (authentication signaling number) such as authentication signals between each of the wireless LAN networks and the center station. Furthermore, this configuration allows effective utilization of frequency bands in a transmission path to be realized.

Furthermore, the authentication server according to a still further embodiment of the present invention is an authentication server placed in a center station which carries out access authentication of a radio terminal apparatus in a wireless LAN access authentication system in a network system comprising a plurality of wireless LAN network systems and a center station that controls the plurality of wireless LAN network systems in a centralized manner, each of the plurality of wireless LAN network systems comprising at least two access point sections accessed by the radio terminal apparatus that transmits/receives a radio signal through a radio section and a gateway apparatus that relays transmission/reception of data signals and control signals between the access point sections, the center station comprising a center station gateway apparatus that relays transmission/reception of data signals and control signals between the gateway apparatuses of the plurality of wireless LAN network systems, the authentication server comprising an access authentication section that performs access authentication when the radio terminal apparatus accesses a predetermined access point section of each of the wireless LAN networks and a cryptographic key distribution section that distributes cryptographic keys of a radio section through which the radio terminal apparatus accesses each gateway apparatus of each of the wireless LAN networks all together.

According to this configuration, it is possible to perform access authentication during access of the radio terminal apparatus and distribute the cryptographic key in the radio section all together, and distribute the cryptographic key to each gateway apparatus of each of the wireless LAN networks.

Furthermore, the gateway apparatus according to a still further embodiment of the present invention is a gateway apparatus in each of the wireless LAN networks in a wireless LAN access authentication system in a network system comprising a plurality of wireless LAN network systems and a center station that controls the plurality of wireless LAN network systems in a centralized manner, each of the plurality of wireless LAN network systems comprising at least two access point sections accessed by the radio terminal apparatus that transmits/receives a radio signal through a radio section, the center station comprising a center station gateway apparatus that relays transmission/reception of data signals and control signals between the gateway apparatuses of the plurality of wireless LAN network systems and an authentication server that performs access authentication of the radio terminal apparatus which has accessed the access point section and distributes cryptographic keys used for encryption of a radio section through which the access-authenticated radio terminal apparatus carries out communication to the radio terminal apparatus and the access point section, the gateway apparatus comprising a transmission/reception section that transmits/receives the data signals and the control signals to/from the center station gateway apparatus of the center station, an access control section that controls the situation of access of the radio terminal apparatus to the authentication server within each wireless LAN network and checks the presence/absence of access of the radio terminal apparatus to the authentication server when the radio terminal apparatus moves to a communication area of a new access point section and a cryptographic key control section that controls cryptographic keys distributed from the authentication server through the access control section and distributes, when it is confirmed that the radio terminal apparatus which has moved to the communication area of the other access point section has already accessed the authentication server, the cryptographic key for the radio section through which the radio terminal apparatus carries out communication to the radio terminal apparatus and the new access point section in the area to which the radio terminal apparatus has moved.

In this configuration, the access control section of the gateway apparatus controls the situation of access of the radio terminal apparatus in each of the wireless LAN networks to the authentication server. When the radio terminal apparatus moves to the communication area of a new access point section, the access control section can check the presence/absence of access of this radio terminal apparatus to the authentication server. Furthermore, when it is confirmed that the radio terminal apparatus has already accessed the authentication server, the gateway apparatus can distribute the cryptographic key of the radio section to the radio terminal apparatus and the new access point section in the area to which the radio terminal apparatus has moved through the cryptographic key control section. Therefore, according to this configuration, it is possible to shorten the time required for the authentication procedure accompanying the movement of the radio terminal apparatus, simplify handover of the radio terminal apparatus to the new access point section, drastically reduce the authentication signaling number between each of the wireless LAN networks and the center station and realize effective utilization of frequency bands in a transmission path.

Furthermore, in the gateway apparatus according to a still further embodiment of the present invention, the access control section includes a control section that controls an access amount of at least one of an access time or communication packet amount of the radio terminal apparatus and requests the radio terminal apparatus for reauthentication at the time at which the access amount has reached a predetermined amount.

This configuration allows the control section to request the radio terminal apparatus for reauthentication when the access amount has reached a predetermined amount, making it possible to update the cryptographic key in the radio section through which this radio terminal apparatus carries out communication. Therefore, this configuration prevents an illegal radio terminal apparatus from making spoofed access by decrypting the cryptographic key.

Furthermore, the radio terminal apparatus according to a still further embodiment of the present invention is a radio terminal apparatus used in a wireless LAN access authentication system in a network system comprising a plurality of wireless LAN network systems and a center station which controls the plurality of wireless LAN network systems in a centralized manner, each of the plurality of wireless LAN network systems including at least two access point sections accessed by the radio terminal apparatus transmitting/receiving a radio signal through a radio section and a gateway apparatus that relays transmission/reception of data signals and control signals between the access point sections, the center station comprising a center station gateway apparatus that relays transmission/reception of data signals and control signals between the gateway apparatuses of the plurality of wireless LAN network systems and an authentication server that performs access authentication on the radio terminal apparatus which has accessed the access point section and distributes the cryptographic key used for encryption of the radio section through which the access-authenticated radio terminal apparatus carries out communication to the radio terminal apparatus and the access point section, the radio terminal apparatus comprising an information card in which ID information is recorded when access authentication is performed by the authentication server of the center station.

According to this configuration, the ID information recorded in the information card (e.g., SIM card or UIM card) of the radio terminal apparatus is used as the authentication ID during access authentication of the radio terminal apparatus. Therefore, even when the user changes the type of the radio terminal apparatus, this configuration prevents the authentication ID from being changed during access authentication of this user, and can thereby control the user ID and billing on the user in a centralized manner This application is based on the Japanese Patent Application No. 2003-137830 filed on May 15, 2003, entire content of which is expressly incorporated by reference herein.

INDUSTRIAL APPLICABILITY

The present invention is applicable to a wireless LAN access authentication system of a radio terminal apparatus in a network system which integrates a plurality of wireless LAN network systems having at least two access point sections accessed by the radio terminal apparatus through a radio section.

What is claimed is:

1. A wireless LAN access authentication system in a network system comprising a plurality of wireless LAN network systems and a center station that controls said plurality of wireless LAN network systems in a centralized manner, each of said plurality of wireless LAN network systems comprising at least two access point sections accessed by a radio terminal apparatus that transmits/receives a radio signal through a radio section and a gateway apparatus which relays transmission/reception of data signals and control signals between said access point sections, said center station comprising a center station gateway apparatus that relays transmission/reception of data signals and control signals between the gateway apparatuses of said plurality of wireless LAN network systems and an authentication server that performs access authentication on said radio terminal apparatus which has accessed said access point sections and distributes cryptographic keys used for encryption of a radio section through which said access-authenticated radio terminal apparatus carries out communication to said radio terminal apparatus and said access point section, said wireless LAN access authentication system comprising:

an access control section provided for each of said plurality of wireless LAN network systems for controlling the situation of access of said radio terminal apparatus in the own communication area to said authentication server and checking the presence/absence of access of said radio terminal apparatus to said authentication server when said radio terminal apparatus moves to a communication area of a new access point section; and a cryptographic key control section provided for each of said plurality of wireless LAN network systems for controlling cryptographic keys distributed from said authentication server and distributing, when said access control section confirms that said radio terminal apparatus which has moved to the communication area of the other access point section has already accessed said authentication server, the cryptographic key for said radio section through which said radio terminal apparatus carries out communication to said radio terminal apparatus and said new access point section in the area to which said radio terminal apparatus has moved.

2. The wireless LAN access authentication system according to claim 1, wherein said access control section and said cryptographic key control section are arranged in said gateway apparatus.

3. The wireless LAN access authentication system according to claim 2, wherein said access control section comprises a control section that controls at least one access amount of an access time of said radio terminal apparatus or communication packet amount and requests said radio terminal apparatus for reauthentication when said access amount reaches a predetermined amount.

4. The wireless LAN access authentication system according to claim 1, wherein said radio terminal apparatus comprises an information card which records ID information and uses the ID information recorded in said information card as an authentication ID at the time of access authentication of said radio terminal apparatus.

5. A wireless LAN access authentication method in a network system comprising a plurality of wireless LAN network systems and a center station that controls said plurality of wireless LAN network systems in a centralized manner,
   each of said plurality of wireless LAN network systems comprising at least two access point sections accessed by a radio terminal apparatus that transmits/receives a radio signal through a radio section and a gateway apparatus which relays transmission/reception of data signals and control signals between said access point sections, and
   said center station comprising a center station gateway apparatus that relays transmission/reception of data signals and control signals between the gateway apparatuses of said plurality of wireless LAN network systems and an authentication server that performs access authentication on said radio terminal apparatus which has accessed said access point sections and distributes cryptographic keys used for encryption of a radio section through which said access-authenticated radio terminal apparatus carries out communication to said radio terminal apparatus and said access point section,
   said wireless LAN access authentication method comprising:
   an access control step of controlling the situation of access of said radio terminal apparatus in each of said wireless LAN network systems to said authentication server and checking the presence/absence of access of said radio terminal apparatus to said authentication server when said radio terminal apparatus moves to a communication area of a new access point section; and
   a cryptographic key control step of controlling cryptographic keys distributed from said authentication server and distributing, when it is confirmed in said access control step that the radio terminal apparatus which has moved to the communication area of the other access point section has already accessed said authentication server, the cryptographic key for the radio section through which said radio terminal apparatus carries out communication to said radio terminal apparatus and said new access point section in the area to which said radio terminal apparatus has moved.

6. A gateway apparatus in each of wireless LAN networks in a wireless LAN access authentication system in a network system comprising a plurality of wireless LAN network systems and a center station that controls said plurality of wireless LAN network systems in a centralized manner,
   each of said plurality of wireless LAN network systems comprising at least two access point sections accessed by a radio terminal apparatus that transmits/receives a radio signal through a radio section,
   said center station comprising a center station gateway apparatus that relays transmission/reception of data signals and control signals between the gateway apparatuses of said plurality of wireless LAN network systems and an authentication server that performs access authentication on said radio terminal apparatus which has accessed said access point section and distributes cryptographic keys used for encryption of a radio section through which said access-authenticated radio terminal apparatus carries out communication to said radio terminal apparatus and said access point section,
   said gateway apparatus comprising:
   a transmission/reception section that transmits/receives said data signals and said control signals to/from the center station gateway apparatus of said center station;
   an access control section that controls the situation of access of said radio terminal apparatus to said authentication server within each of said wireless LAN networks and checks the presence/absence of access of said radio terminal apparatus to said authentication server when said radio terminal apparatus moves to a communication area of a new access point section; and
   a cryptographic key control section that controls said cryptographic keys distributed from said authentication server through said access control section and distributes, when it is confirmed that said radio terminal apparatus which has moved to the communication area of the other access point section has already accessed said authentication server, said cryptographic key for the radio section through which said radio terminal apparatus carries out communication to said radio terminal apparatus and the new access point section in the area to which said radio terminal apparatus has moved.

7. The gateway apparatus according to claim 6, wherein said access control section comprises a control section that controls an access amount of at least one of an access time or communication packet amount of said radio terminal apparatus and requests said radio terminal apparatus for reauthentication at the time at which said access amount has reached a predetermined amount.

8. A radio terminal apparatus used in a wireless LAN access authentication system in a network system comprising a plurality of wireless LAN network systems and a center station which controls said plurality of wireless LAN network systems in a centralized manner,
   each of said plurality of wireless LAN network systems comprising at least two access point sections accessed by a radio terminal apparatus transmitting/receiving a radio signal through a radio section and a gateway apparatus that relays transmission/reception of data signals and control signals between said access point sections,
   said center station comprising a center station gateway apparatus that relays transmission/reception of data signals and control signals between the gateway apparatuses of said plurality of wireless LAN network systems and an authentication server that performs access authentication on said radio terminal apparatus which has accessed said access point section and distributes the cryptographic key used for encryption of the radio section through which said access-authenticated radio terminal apparatus carries out communication to said radio terminal apparatus and said access point section, said radio terminal apparatus comprising an information card in which ID information is recorded when access authentication is performed by said authentication server of said center station.

* * * * *